W. B. MURRAY.
TRAIN CONTROL SYSTEM.
APPLICATION FILED JULY 31, 1915.
1,296,838.
Patented Mar. 11, 1919.
6 SHEETS—SHEET 4.
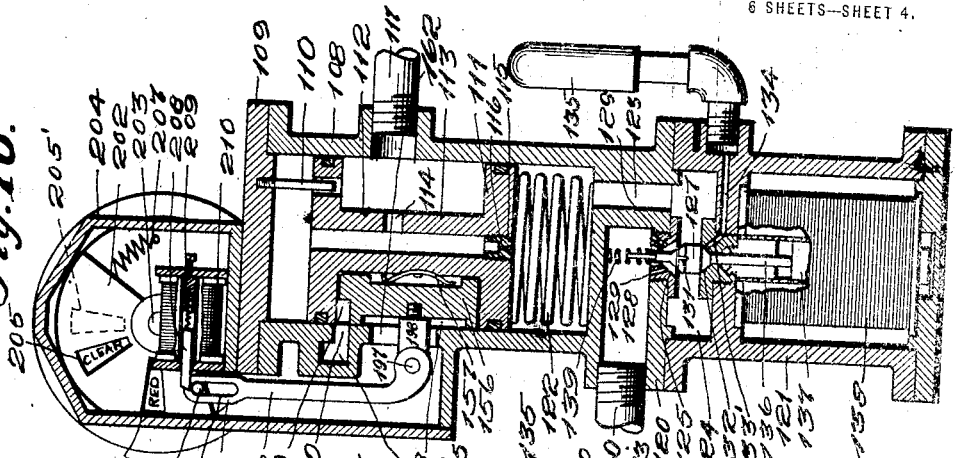
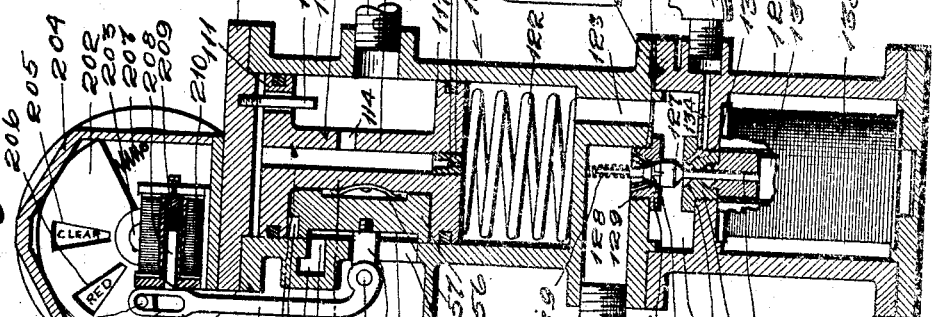
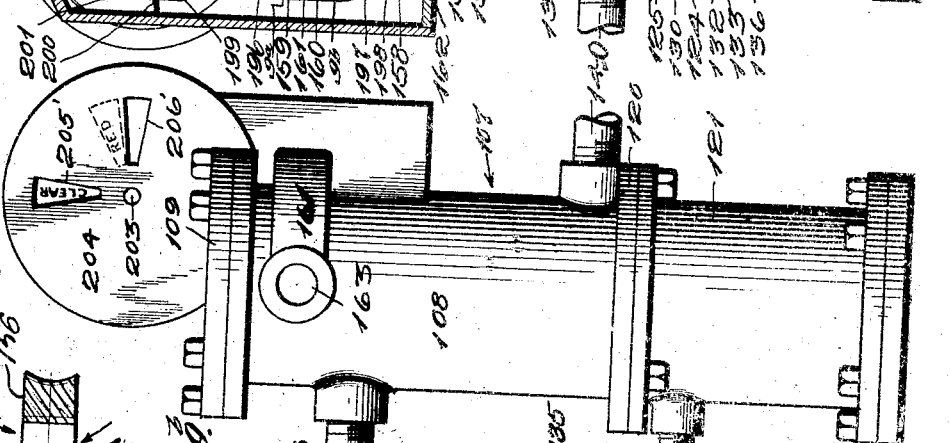
Witness
J. M. Lyles
Inventor
William B. Murray,
By
E. L. Parker
Attorney

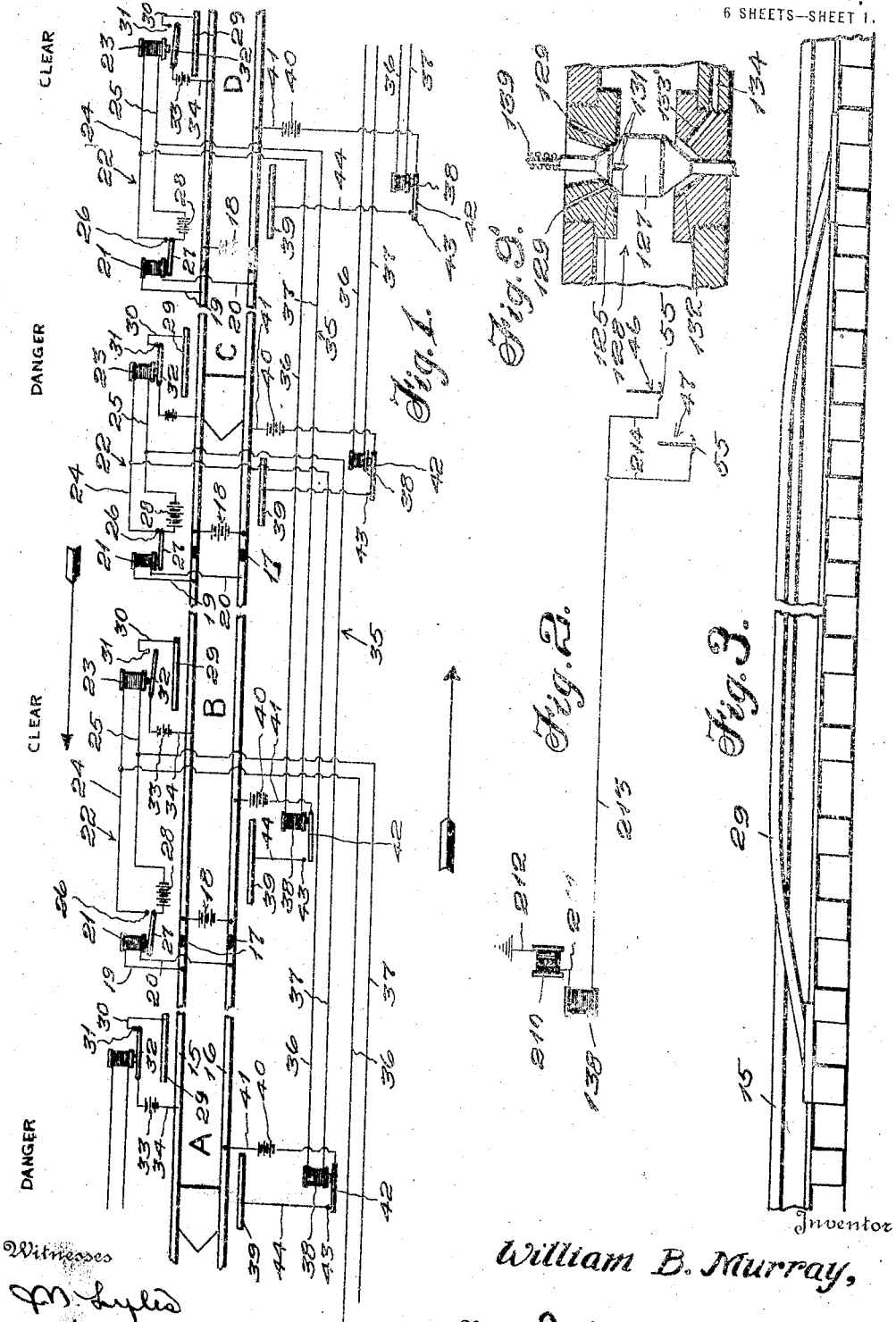

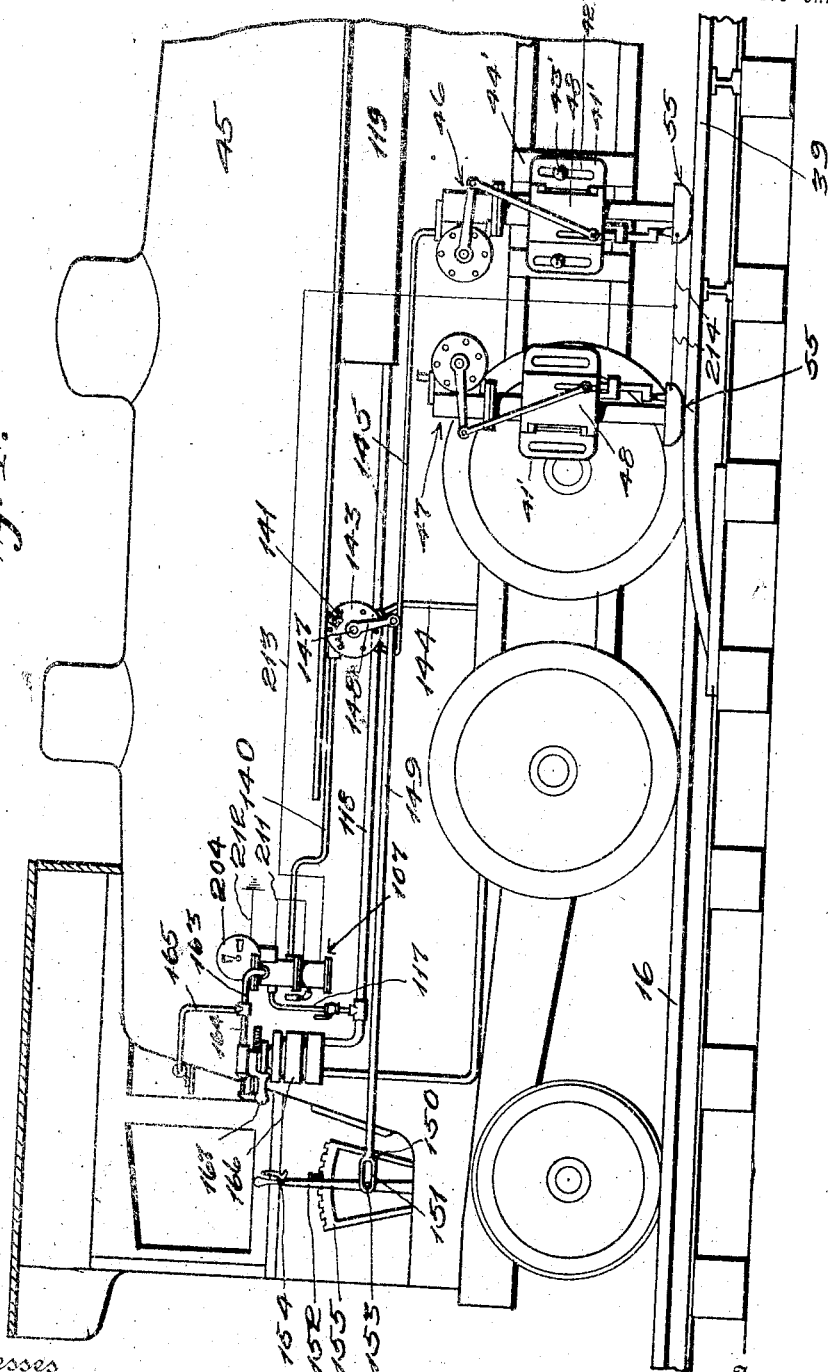

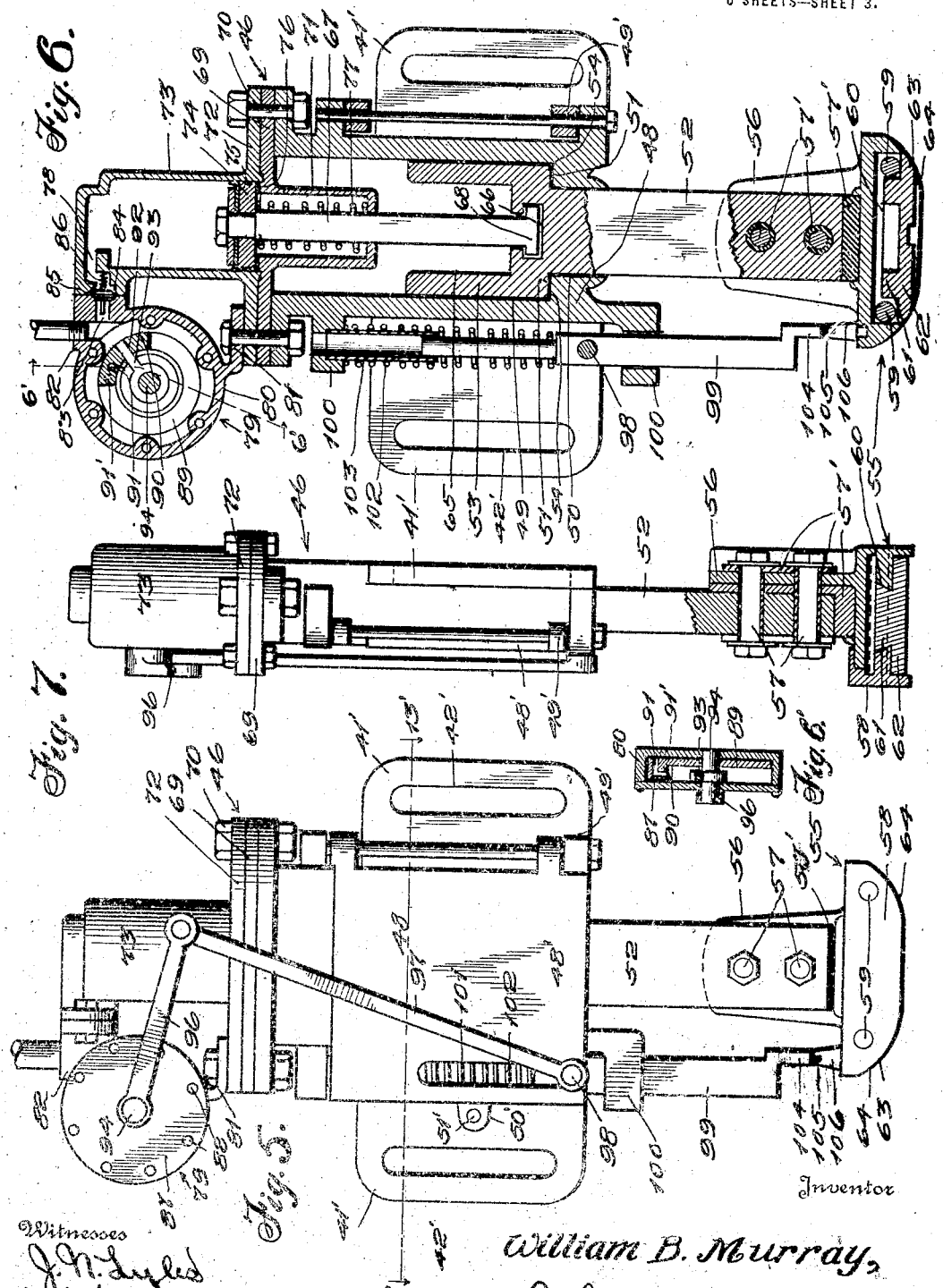

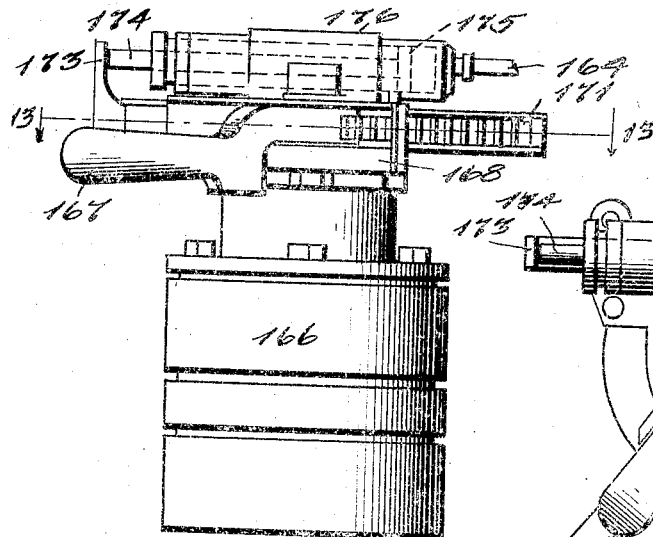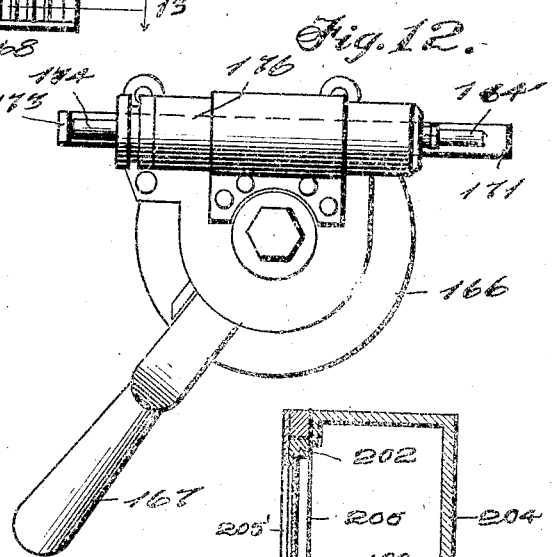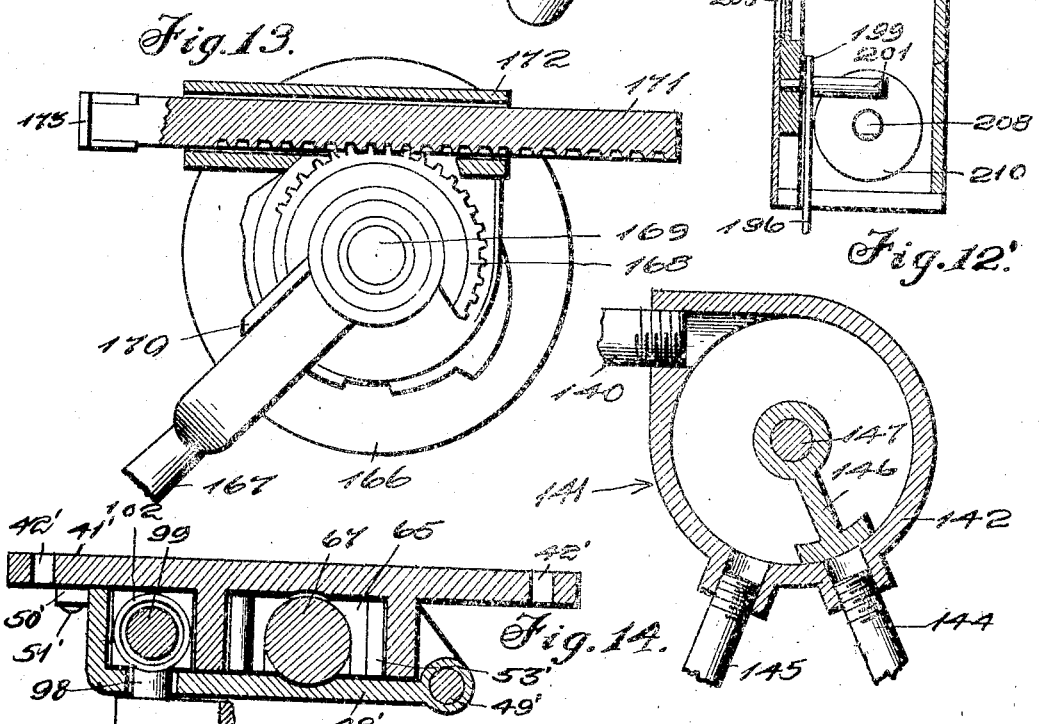

William B. Murray, Inventor

UNITED STATES PATENT OFFICE.

WILLIAM B. MURRAY, OF DANVILLE, ILLINOIS, ASSIGNOR TO THE MILLER TRAIN CONTROL CORPORATION, OF STAUNTON, VIRGINIA, A CORPORATION OF VIRGINIA.

TRAIN-CONTROL SYSTEM.

1,296,838.     Specification of Letters Patent.      Patented Mar. 11, 1919.

Application filed July 31, 1915. Serial No. 42,952.

*To all whom it may concern:*

Be it known that I, WILLIAM B. MURRAY, a citizen of the United States, residing at Danville, in the county of Vermilion and State of Illinois, have invented certain new and useful Improvements in Train-Control Systems, of which the following is a specification.

My invention relates to improvements in railway systems, wherein mechanically actuated and electrically controlled vehicle stopping or signaling apparatus, or vehicle controlling apparatus, is carried by the vehicle traveling upon the track, and operated by ramp or ramps arranged suitably near the track, having a circuit or circuits associated therewith.

An important object of the invention is to provide apparatus included in a system of the above mentioned character which is adapted to be carried by a vehicle, and having its parts arranged in a compact and convenient manner.

A further object of the invention is to provide signal means adapted to be operated in conjunction with the train stopping means, in a novel and simple manner.

Other objects and advantages of the invention will be apparent during the course of the following description.

Figure 15:
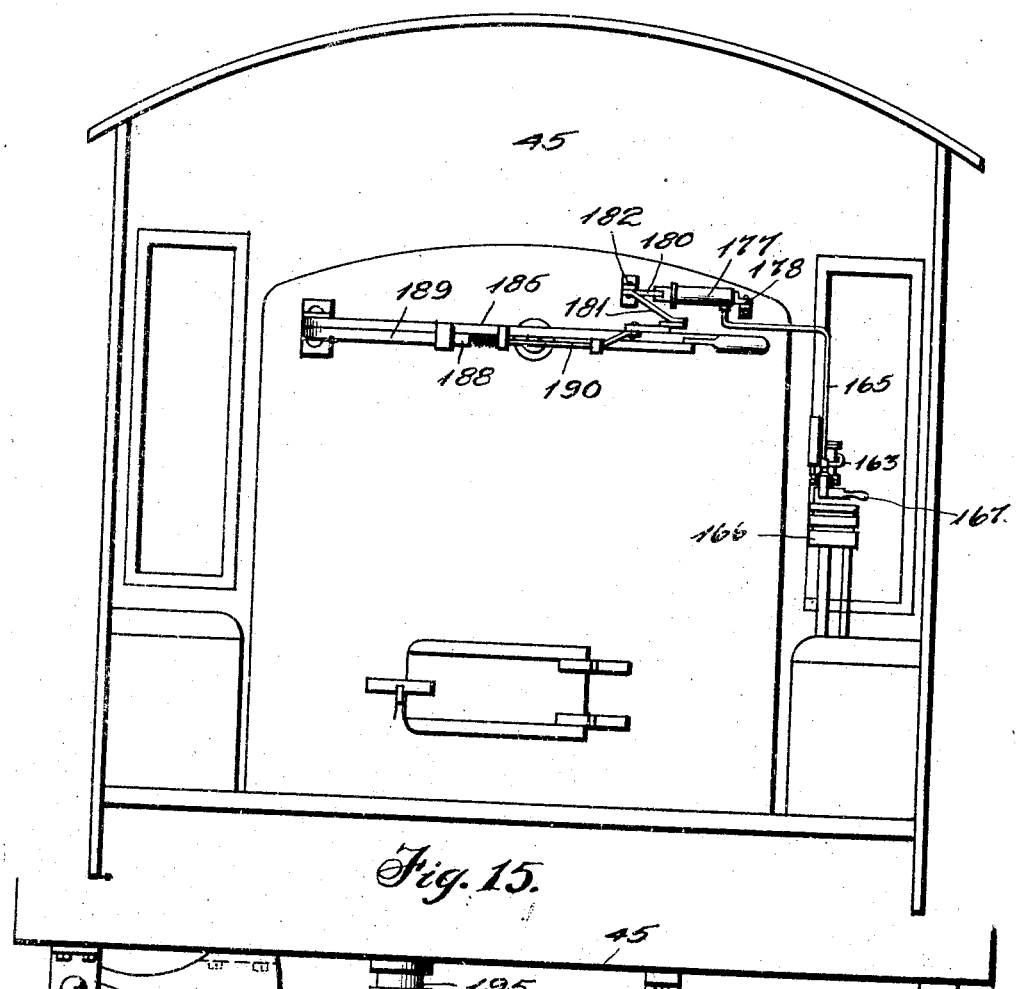
Figure 16:
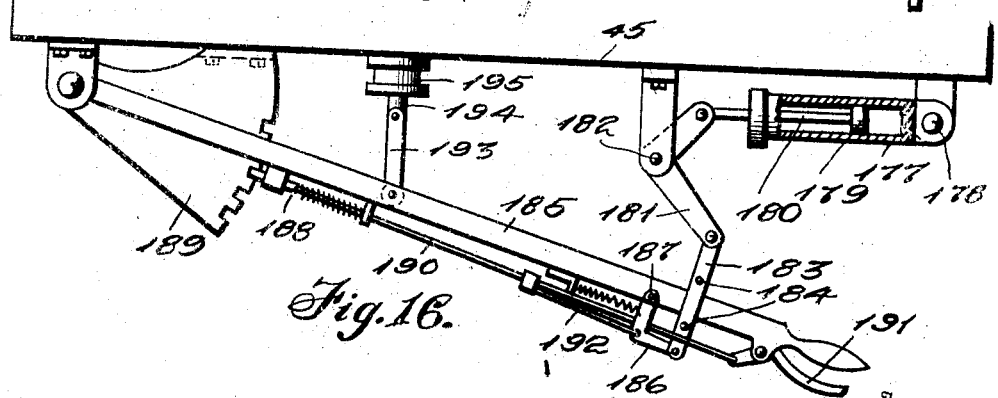

In the accompanying drawings forming a part of this specification and in which like numerals are employed to designate like parts throughout the same, Figure 1 is a diagrammatic view of a track and associated circuits, Fig. 2 is a diagrammatic view of a pair of vertically movable shoes and associated circuit or circuits, Fig. 3 is an enlarged side elevation of a ramp, Fig. 4 is a side elevation of apparatus embodying the invention, showing the same installed upon a railway locomotive, with one mechanically operated apparatus disposed out of the proper position for the purpose of illustration, Fig. 5 is an enlarged side elevation of the mechanically operated apparatus carried by the vehicle, Fig. 6 is a central longitudinal sectional view through the same, certain elements being in elevation, Fig. 7 is an edge elevation of the same, with the shoe in transverse section, Fig. 6' is a transverse sectional view taken on line 6'—6' of Fig. 6, Fig. 8 is a side elevation of electrically operated controlling apparatus, Fig. 9 is a central vertical longitudinal sectional view through the same, certain elements being in elevation, and the plunger in the upper position, Fig. 9' is a detail section of the electromagnetic valve shown in Fig. 9, Fig. 9$^a$ is a detail section taken on line 9$^a$ of Fig. 9, Fig. 9$^b$ is a similar view taken on line 9$^b$ of Fig. 9, Fig. 10 is a similar view with the plunger in a lower position, Fig. 11 is a side elevation of the means for operating the engineer's air brake valve, Fig. 12 is a plan view of the same, Fig. 13 is a plan view, of the same, parts being shown in section, taken on line 13—13 of Fig. 11, Fig. 12' is a transverse sectional view taken on line 12'—12' of Fig. 9, Fig. 13' is a horizontal sectional view taken on line 13'—13' of Fig. 5, Fig. 14 is a detailed section through a cut-out valve structure, Fig. 15 is a side elevation of means for operating the throttle lever, and, Fig. 16 is a plan view of the same.

In the drawings, wherein for the purpose of illustration is shown a preferred embodiment of my invention, attention being called first to Fig. 1, the numerals 15 and 16 designate traffic rails, insulated at spaced intervals, as shown at 17, providing blocks A, B, C, and D of suitable length. The traffic upon the track may be in opposite directions, as indicated by the arrows.

Connected with the corresponding ends of the rails 15 and 16, in each block, is a source of current 18, as shown. Connected with the opposite ends of the rails 15 and 16, in each block, are wires 19 and 20, respectively, having an electro-magnet 21 connected therewith. When each block is clear, the block track circuit is closed and the electro-magnet 21 is energized. Current flows in this closed circuit from the positive pole of the source of current 18, through rail section 15, wire 19, electro-magnet 21, wire 20, rail section 16, and back to the opposite pole of the source of current 18.

The numeral 22 designates a local circuit as a whole, comprising an electro-magnet 23, connected with wires 24 and 25. The wire 24 is connected with a stationary contact 26, adapted to engage and disengage a swinging contact 27, pivoted near the electro-magnet 21. The contact 27 is held elevated by the electro-magnet 21 when it is energized whereby the pivoted contact has electrical connection with the contact 26, but when the electro-magnet 21 is deënergized, the contact 27 automatically drops and disengages the contact 26. Electrically connected with the contact 27 is one pole of a source of current 28, connected in the wire 25. When the contacts 26 and 27 engage, the local circuit 22 is closed, and the electro-magnet 23 is energized, current flowing in this closed circuit from the positive pole of the source of current 28, through contact 27, contact 26, wire 24, electro-magnet 23, and wire 25, back to the opposite pole of the source of current 28.

Arranged suitably in advance of the entrance end of each block (with respect to the traffic being from right to left) is a ramp 29, which is preferably arranged exteriorly of the rail 15, as shown. This ramp is curved longitudinally in a vertical plane and rises toward its central portion, as clearly shown in Fig. 3. Electrically connected with each ramp 29 is a wire 30, connected with a stationary contact 31. This stationary contact is adapted to engage and disengage a pivoted contact 32, arranged adjacent the electro-magnet 23, and held elevated thereby to engage the contact 31, when the electro-magnet 23 is energized, but automatically drops to break this engagement when the electro-magnet 23 is deënergized. The contact 32 has electrical connection with a source of current 33, the opposite pole of which is electrically connected with the rail section 15 by a wire 34 or the like. It is thus apparent that when the block ahead (with respect to the traffic being from right to left) is clear, the ramp 29 which guards the entrance end of such block is electrically connected with its source of current, but when this block is occupied, by a train or other vehicle, the ramp 29 is disconnected from the source of current by contacts 31 and 32 disengaging. Connected with the local circuit 22 is a branch local circuit designated as a whole by the numeral 35, comprising wires 36 and 37, connected respectively with the wires 24 and 25. These wires extend longitudinally of the track and have an electro-magnet 38 connected therein, which is arranged suitably near a ramp 39, identical with the ramp 29. One ramp 39 is disposed near the entrance end of each block (with respect to the traffic being from left to right), preferably upon the outer side of the rail 16. When the local circuit 22 is closed, as above stated, current flows from the source of current 28 through contact 27, contact 26, wire 24, wire 36, electro-magnet 38, wire 37, wire 25, and back to the opposite pole of the source of current 28. It is thus apparent that the two ramps 29 and 39 are simultaneously energized and deënergized. The numeral 40 designates a source of current connected in a wire 41, connected with the rail section 16 and a vertically swinging contact 42. This contact is adapted to engage and disengage a stationary contact 43, connected with a wire 44, in turn connected with the ramp 39. The contact 42 is arranged adjacent the electro-magnet 38 and when this magnet is energized, the contact 42 is held elevated to engage the contact 43, but when the electro-magnet 38 is deënergized, the contact 42 automatically drops to break such engagement.

Attention is now called more particularly to Figs. 4 to 7 inclusive, showing a ramp or mechanically operated apparatuses carried by the locomotive or other vehicle. The numeral 45 designates a railway locomotive as a whole, of any well known or preferred type. The numerals 46 and 47 designate ramp or mechanically operated apparatuses, as a whole, arranged upon opposite sides of the locomotive, preferably in transverse alinement, the apparatus 47 being shown out of place, in Fig. 4, for the purpose of illustration. When the engine is traveling from right to left the apparatus 46 is adapted to contact with ramps 29 and the apparatus 47 with ramps 39. These apparatuses are identical and a detailed description of only one of them will be given.

Each apparatus comprises an outer casing 48, having vertical flanges 41', provided with longitudinal slots 42', for receiving bolts 43' or the like, carried by a plate 44', suitably attached to the frame-work of a locomotive. While I have shown these apparatuses as arranged forwardly of the drivers of the locomotive, it is to be understood that they may be arranged rearwardly of the drivers, upon the tender-trucks of the locomotive, or at any other desired point. As more clearly shown in Fig. 6, the casing 48 is provided with a main vertical opening 49, which leads into a lower contracted vertical opening 50, providing stop shoulders 51, as shown. Mounted to reciprocate within the opening 50 is a vertically movable bar or member 52, carrying an enlarged head 53, preferably cast integral therewith. This head has shoulders 54, adapted to contact with the shoulders 51 for positively limiting the downward movement of the bar 52. The outer side of the casing 48 is formed open and normally covered by a horizontally swinging door 48', hinged thereto as shown at 49'. This door is held closed by a lug 50', apertured to receive a bolt 51', engaging the casing 48.

The bar 52 carries at its lower end a shoe designated as a whole by the numeral 55. This shoe is provided with an upwardly extending flat shank 56 (see Fig. 7) clamped to the lower side of the bar 52 by bolts 57 or the like, insulating material 57' being arranged between these parts whereby the shoe 55 is thoroughly insulated from the bar 52. As clearly shown in Figs. 6 and 7, the shoe 55 embodies a removable side plate 58, normally secured in place by transverse bolts 59 or the like. A dove-tailed opening or slot 60 is formed in the shoe 55, and decreases in width downwardly, as shown. This groove is adapted to receive dove-tailed lug or lugs 61, carried by a hard steel block 62, and preferably cast integral therewith. The ends of this block are preferably tapered, as shown at 63, and are flush with tapered ends 64 of the shoe 55. It is thus apparent that the block 62 contacts with the ramp and takes up the wear, but if the block 62 should be lost by accident or the like, the contact can still be made between the tapered ends 64 and the ramp.

As more clearly shown in Fig. 6, the head 53 is provided with a longitudinal opening or recess 65, with an inverted T-shaped opening 66 at its lower end, the opening 66 extending transversely through the opposite sides of the upper end of the bar 52. Extending longitudinally within the opening 65 is a plunger-rod 67, provided at its lower end with a laterally extending head 68, slightly smaller than the transverse portion of the T-shaped opening 66. It is thus apparent that the plunger-rod 67 is connected with the bar 52, whereby the rod may be moved by the bar, but the connection is such that a slight relative longitudinal movement between these parts may be had for a purpose to be described.

The numeral 69 designates an end or head which is rigidly secured to the flanged upper end of the casing 48, by bolts 70 or the like. This head is provided with a depending tubular member 71, having its lower end apertured for receiving the rod 67, as shown. Arranged upon the head 69 is a second head 72, secured in place by the bolts 70. This head has an upstanding cylinder 73 formed thereon and preferably cast integral therewith.

Mounted to reciprocate within the cylinder 73 is a plunger 74, having suitable packing 75. This plunger is rigidly attached to the upper end of the rod 67, as shown. Arranged upon the upper surface of the head 69 within the cylinder 73 is an elastic packing ring 76, formed of leather or the like. Disposed within the tubular member 71 is a compressible coil spring 77, engaging the lower end of this member and the plunger 74, to move the latter upwardly, when pressure is released from its upper surface. When the bar 52 descends to its lowermost position, shoulders 51 and 54 contact, positively limiting such movement, while the pressure in the cylinder 73 moves the plunger 74 into firm contact with the packing ring 76, the plunger being capable of partaking of slight vertical movements with respect to the bar 52, due to the lost motion connection between these parts, as above explained. It is thus apparent that the bar 52 and the rod 67 are independently supported, when in the lowermost position.

The cylinder 73 is provided in its upper end with a port 78, for a purpose to be described.

The numeral 79 designates a valve structure as a whole, embodying a preferably circular casing 80, having an extension or bracket 81, held fast in place by one of the bolts 70. This casing is provided near its upper end with a tubular extension or nipple 82, which is bolted or otherwise secured to the upper portion of the cylinder 73, as shown. The nipple 82 is provided with a laterally extending port 83, communicating with the port 78 through a chamber 84. Within this chamber is mounted a check valve 85, opening inwardly with respect to the cylinder 73 and normally held seated by a spring 86. The valve 85 and its chamber are preferably so constructed that a slow or slight leakage of pressure from the cylinder 73 is permitted, when this cylinder is cut off from the source of compressed air, as will be more fully explained. One side of the casing 80 is open and is covered by a plate 87, attached thereto by bolts 88 or the like. The numeral 89 designates a disk-valve provided with an enlarged segmental portion 90, having a transverse opening 91 arranged near one end thereof. This opening 91 extends through one face of the segment and its inner side and is adapted for registration with an exhaust port 91', formed in the casing 80 and leading to the atmosphere. This enlarged segmental portion 90 is provided with a radial groove or slot 92, to receive one end of a crank 93, rigidly attached to a rock shaft 94, upon which the disk-valve 89 is pivotally mounted.

Connected with the outer end of the rock shaft 94 is a crank 96, for turning it, having pivotal connection with the outer end of a pitman 97, pivotally connected by a pin 98 with a supplemental vertically movable bar 99. This bar is mounted to reciprocate within guide element or elements 100 formed upon the casing 48 and the pin 98 travels in a longitudinal slot 101, as shown. The supplemental bar 99 is moved downwardly by a compressible coil spring 102, surrounding a reduced upper portion thereof, and a tube 103, receiving this reduced portion and attached to one of the guide elements 100. At its lower end, the supplemental bar 99 is provided with an extension 104, adapted to contact with the insulated end 105, of a push-member 106, rigidly attached to the shoe 55. It is to be distinctly understood that the extension 104 and push-member 106 are not connected but they are normally in vertical alinement, whereby upon the upward movement of the shoe 55 the push member 106 will elevate the supplemental bar 99. If the shoe 55 should break off or become laterally bent or displaced sufficiently to cause it to fail to contact with the ramp, the push-member 106 will be moved out of vertical alinement with the extension 104, whereby the spring 102 would move the supplemental rod 99 downwardly below the normal lowermost position, the pin 98 being spaced a substantial distance from the lower guide means 100, when the bar 52 is in the lowermost position. This downward movement of the supplemental bar 99, through the medium of the connecting elements 96 and 97 will swing the disk-valve 89 clockwise sufficiently to cause the upper end of the segmental portion 90 to clear or uncover the port 91', thus placing the interior of the casing 80 in communication with the atmosphere, for a purpose to be decribed.

Attention is now called to Figs. 4, 8, 9 and 10, wherein is shown electrically operated control means, designated as a whole by the numeral 107. This control means comprises an upper cylinder 108, which may be bolted or otherwise rigidly secured to the locomotive, preferably within the cab. The cylinder 108 has its upper end closed by a head 109, carrying a depending guide element or pin 110, operating through an opening formed in one of the ends 111 of a plunger 112. This plunger 112 is mounted to reciprocate within the cylinder 108 and embodies a tubular body portion 113, carrying the ends 111. The tubular body portion 113 is provided with a lateral port 114, in communication with the interior of the tubular body portion. The upper end of the tubular body portion is open and its lower end is closed by a screw-threaded plug 115 having a contracted or pin hole exhaust port 116.

Leading into one side of the cylinder 108 is an air pressure supply pipe 117, which is connected with a pipe 118, leading to a source of air pressure, such as a main pressure tank 119, as shown.

The lower end of the cylinder 108 is covered by a head or casting 120, engaging the upper end of a second cylinder 121, and rigidly secured thereto. A suitably stiff compressible coil spring 122 is arranged between the lower end 111 and the head or casting 120, to oppose the downward movement of the plunger 112. The head 120 is provided with a port 123, leading into a chamber 124, formed in the upper end of the cylinder 121. The head or casting 120 is provided with a screw-threaded opening, receiving a valve seat 125, having an opening which discharges into a chamber 128 formed in the head or casting 120. This valve seat 125 has contracted or pin hole ports 129, which lead from the chamber 128 to the opening of the valve seat. A vertically movable valve 127 is provided upon its upper end with an annular pin hole groove 130, adapted for registration with the ports 139 and has a branch port 131 connected therewith and in communication with the chamber 124. When the valve 127 engages the seat 125 the ports 129 and 130 are in registration and will permit of the slow escape of pressure past this valve from the chamber 124 to the chamber 128. This slow escape of pressure is not sufficient to effect a downward movement of the plunger 112. The valve 127 is adapted when moved downwardly to engage a valve seat 132, formed in a stuffing box 133, secured to the upper end of the cylinder 121. The opening of the valve seat 132 has communication with a contracted or pin hole port 133', having communication with a port 134, in turn communicating with a whistle 135. When the valve 127 is elevated so that it disengages its lower seat 132 and pressure is supplied into the chamber 124, it is obvious that the whistle 135 will be sounded.

The valve 127 is carried by a reciprocatory rod 136, operating through the stuffing box 133. The rod 136 is connected with a vertically movable core 137 arranged within a stationary solenoid winding 138. When the solenoid winding is energized the core and rod 136 are moved upwardly and when deënergized they move downwardly by gravity. The rod 136 is also moved downwardly by a spring 139, engaging therewith.

Having communication with the chamber 128 is a pipe 140, which as more clearly shown in Figs. 4 and 14, is connected with a cut out valve structure 141. This valve structure embodies a casing 142, see Fig. 14, suitably secured to the side of the locomotive and having its outer side covered by a plate 143. The casing 142 has outlet pipes 144 and 145 connected therewith, which lead respectively to the tubular extensions 82 of the cylinders 73 in the apparatuses 47 and 46. As more clearly shown in Fig. 14, a swinging valve 146 is arranged within the casing 142 and adapted to alternately cover the intake ends of the pipes 144 and 145. The valve 146 is rigidly mounted upon a rock shaft 147, having a crank 148, rigidly connected with its outer end. This crank has connection with a reach rod 149, provided with a head 150, having a longitudinal slot 151. The numeral 152 designates the valve gear shifting or reversing lever of the locomotive, carrying a pin 153, operating in the slot 151. The lever 152 is provided with the usual latch means 154, detachably engaging a toothed quadrant 155. When the lever 152 is swung forwardly, to shift the valve gear to cause the locomotive to travel forwardly the rod 149 moves forwardly and swings the crank 148 forwardly, which moves the valve 146 forwardly, closing the intake end of the pipe 144, whereby the mechanically operated apparatus 47 is rendered inactive, as will be more fully explained. When the lever 152 is moved rearwardly for allowing the expansion of steam in the cylinders of the engine during its forward travel, it does not effect a movement of the rod 149 until it is moved past the central position. The lever 152 is not moved rearwardly beyond the central position unless it is desired to reverse the valve gear to cause the engine to travel rearwardly. When the lever is moved rearwardly past the central position the rod 149 is moved rearwardly and the valve 146 closes the intake end of the pipe 145 and uncovers the intake end of the pipe 144, whereby the mechanically operated apparatus 46 is rendered inactive and the apparatus 47 active.

The numeral 156 designates a slide valve, arranged upon the side of the tubular body portion 113 of plunger 112 between its ends or heads 111. This slide valve is moved outwardly for a suitable slidable contact with the inner wall of the cylinder 108 by a spring 157, as shown. The slide valve 156 is provided upon its outer side with a longitudinal groove or surface port 158, which does not extend through its sides and ends and with a transverse port 159, at its top, which does extend through the sides and upper end thereof. When valve 156 is in the upper position as in Fig. 9, the upper end of the port 158 is adapted for registration with a port 160, communicating with a chamber 161, while the lower end of the port 158 is in communication with an opening or slot 162, leading to the atmosphere. When the valve 156 is lowered, as shown in Fig. 10, the upper end of the port 158 has no communication with the port 160, but the port 159 communicates therewith whereby the port 160, which accordingly has communication with the interior of the cylinder 108.

Connected with the chamber 161 is a pipe 163, having pipes 164 and 165 connected therewith. The pipe 164 leads to the means for operating the engineer's air brake valve, and in this connection attention is called to Figs. 11, 12, and 13. In these figures, the numeral 166 designates an engineer's air brake valve of any well known or preferred type, which is operated to reduce the pressure in the train line for applying the brakes by swinging the hand lever 167 in one direction. The lever 167 is turned in the direction for applying the brakes by a pinion 168, pivotally mounted upon the valve stem 169, and having a flange 170, to contact with the lever 167. The pinion 168 is engaged by a rack bar 171, mounted to reciprocate within a stationary horizontal guide 172. The rack bar is provided at one end with an upstanding portion or lip 173, engaged by a rod 174, connected with a plunger 175, reciprocating in a cylinder 176. This cylinder is held stationary by any suitable means and may be secured to the guide 172. The pipe 164 discharges into the cylinder 176, as shown.

The pipe 165 leads to the means for operating or closing the throttle lever, as more clearly shown in Figs. 15 and 16. The pipe 165 is connected with a horizontally swinging cylinder 177, pivotally supported, as shown at 178. Mounted to reciprocate within the cylinder 177 is a plunger 179, connected with a rod 180. This rod is pivotally connected with a swinging bell crank lever 181, which is pivotally supported as shown at 182. Connected with the outer arm of the bell crank lever 181 is a link 183, carrying spaced pins 184, arranged upon opposite sides of a throttle lever 185, for contact therewith and move it. The link 183 is connected with a bell crank lever 186, pivoted to the throttle lever, as shown at 187. The throttle lever 185 is provided with the usual reciprocatory latch 188, to coöperate with a stationary toothed quadrant 189. The latch 188 is moved by a rod 190, pivotally connected with a hand grip 191. Connected with the rod 190 is a rod 192, which is also connected with the bell crank lever 186. The pins 184 being spaced from the throttle lever 185, it is obvious that upon the inward movement of the link 183, the bell crank lever 186 will first move the latch 188 to bring it out of engagement with the toothed quadrant, subsequent to which the outer pin 184 will contact with the throttle lever 185 and swing it to the closed position. The throttle lever 185 is connected by means of a link 193 with a throttle valve rod or stem 194, operating through a stuffing box 195, as is customary.

It might be stated at this point, when the engine is stopped due to the danger condition of the block, the plunger 112 (Fig. 10) moves downwardly in the cylinder 108. I provide signal means to indicate this danger operation of the plunger and the danger state of the block, comprising an upstanding arm 196, as more clearly shown in Figs. 9 and 10. This arm 196 is pivotally connected, as shown at 197, with a block 198, operating in the slot 162 and attached to the valve 156, such block serving as guide means for the valve. The upper end of the arm 196 is provided with a head 199, having an elongated slot or opening 200 formed therein for receiving a pin 201, formed upon a swinging signal disk 202. This swinging signal disk (see Fig. 12′) is pivotally supported by a centrally arranged pin 203, and the disk is disposed within a casing or housing 204, suitably arranged upon the cylinder 108, as shown. The disk 202 is provided with segmental openings 205 and 206, which are preferably covered by colored glass, the opening 205 having white glass, and the opening 206 red glass. The opening 205 is adapted to register with an opening 205′ formed in the face of the casing 204 and the opening 206 is adapted to register with an opening 206′ formed in this face. A spring 207 is connected with the disk 200 to swing it to the clear position to bring the opening 205 into registration with the opening 205′. When the plunger 112 moves downwardly, upon the stopping of the train, the arm 196 moves downwardly, whereby the upper end of the wall of the opening 200, contacts with the pin 201, and swings the disk 202 downwardly, bringing openings 206 and 206′ into registration.

When this takes place, a bolt 208, automatically moves above and across the pin 201, retaining the pin in the lower position. The bolt 208 is moved toward the pin 201 by a compressible coil spring 209. The bolt 208 is moved in an opposite direction to release the pin 201 by a horizontal solenoid winding 210, when it is energized. This solenoid winding is held stationary within the casing 204 by any suitable means. It is thus apparent that the signal means will remain set at danger, until the shoe 55 contacts with the next ramp, which is energized, as will be more fully explained.

The solenoid windings 138 and 210 are connected in series by a wire 211. The upper end of the winding 210 is connected with a wire 212, which is grounded to the framework of the engine. Connected with the lower end of the winding 138 is a wire 213, connected with branch wires 214, which are electrically connected with the shoes 55, as shown.

The operation of the apparatus is as follows:

For the purpose of illustration, it will be assumed that an engine is in each of blocks A and C. In considering first the traffic in one direction, to wit, from right to left, it may be assumed that the engine has traveled from block D into block C. Block C is therefore at danger condition. When the engine enters block C, the electro-magnet 21 thereof is cut out of circuit, and contact 27 drops to disengage contact 26. This movement of contact 27 opens the local circuit 22, whereby the electro-magnet 23 is deënergized. When this magnet 23 is deënergized the contact 32 drops, disengaging contact 31, whereby the ramp circuit is opened, and the ramp 29 guarding the entrance end of block C, disconnected from its source of current. When the local circuit is opened the branch local circuit 35 is opened. This opening of the branch local circuit deënergizes the electro-magnet 38, whereby contact 42 drops to disengage contact 43, and the ramp 39 which guards the entrance end of block B, with respect to traffic being from left to right, is disconnected from its source of current 40. It is thus apparent that the block C is protected in the rear by the deënergized ramp 29 and a block ahead by the ramp 39. As the locomotive is traveling forwardly from right to left, the apparatus 46 is in the lower active position, while the apparatus 47 is in the inactive position. This is accomplished by the valve shifting lever 152 being moved forwardly, which moves the rod 149 forwardly, swinging the crank 148 to the forward position. This movement of the crank 148 moves the valve 146 to a position to cover the intake end of the pipe 144. The compressed air is accordingly cut off from the cylinder 73 in the apparatus 47, and the compressed air therein gradually leaks or exhausts therefrom through the valves 85 and 89. This gradual discharge or leakage of compressed air from the cylinder 73 permits the spring 77 to gradually move the rod 67 upwardly, carrying the shoe 55 and associated elements with it. This upward movement of the shoe moves the supplemental bar 99 upwardly, which swings the pitman 97 upwardly, to bring the ports 91 and 91′ into registration. When this is done, the compressed air remaining in the cylinder 73 may more readily escape to the atmosphere, the spring 77 further elevating the shoe 55 and associated elements so that it is raised wholly above the set of ramps 39, and will not contact therewith. It is obvious that if the engine were reversed, by swinging the lever 152 rearwardly, the valve 146 (see Fig. 12′) would be swung rearwardly and pipe 145 cut off from the casing 142, and the pipe 144 placed in communication therewith. The pressure would then be fed into the cylinder 73 of apparatus 47, whereby the piston 74 will be moved downwardly and the shoe 55 and associated elements returned to their normal active position. The apparatus 46 would then be rendered inactive and the shoe 45 and associated elements elevated above the set of ramps 29, so that it could not contact therewith. By this means the engine would not be improperly stopped when backing, by engagement with the shoe 55 of apparatus 46 with the ramps 29, while the travel of the engine in a reverse direction would be properly controlled by the contact of the shoe 55 and apparatus 47 with the ramp sections 39. The ramp 29 which guards the entrance end of the block B, is connected with its source of current, and is engaged by the shoe 55 of the mechanically operated apparatus 46, carried by the locomotive when it travels into block C toward the entrance end of block B. When the shoe 55 of the apparatus 46 contacts with the energized ramp 29 it is elevated. This upward movement of the shoe moves the bar 52 upwardly, against the pressure of the air within the cylinder 73, which normally holds the bar and shoe in the lowermost position, for proper electrical contact with the ramp. This upward movement of the shoe 55 moves the push element 106 upwardly, which contacts with the extension 104, and moves the auxiliary bar 99 upwardly. This upward movement of the bar 99 moves the pitman 97 upwardly, which turns the crank 96 in the same direction. The crank 96 is turned sufficiently to bring port 91 into registration with the port 91', whereby communication is established between the pipe 145 and the atmosphere. When the engine moves into proximity to the ramp 29 guarding the entrance end of block B, as above stated, and the shoe 55 of apparatus 46 contacts therewith and is elevated thereby, a train circuit is closed for energizing the solenoid winding 138, before the shoe 55 and associated elements have moved upwardly sufficiently to actuate the train stopping means. In this closed circuit, current flows from one pole of the source of current 33, contact 32, contact 31, wire 30, ramp 29, shoe 55, in apparatus 46, wire 214, wire 213, solenoid winding 138, wire 211, solenoid winding 210, wire 212, the frame work of the engine, rail section 15, and through wire 34 back to the opposite pole of the source of current. When the solenoid winding 138 is energized, as above stated, the core 137 is quickly drawn upwardly whereby the valve 127 is seated, upon its upper seat and disengages its lower seat. This upward movement of the valve 127 in engagement with its upper seat 125 prevents any sudden reduction of pressure in the cylinder 108 below the plunger 112 whereby this plunger remains in the upper position and the train will not be stopped. When the valve 127 is seated and the pipe 145 is placed in communication with the atmosphere, the pressure within the cylinder 108 gradually escapes through port 125 and port or ports 129, but this is not sufficient to cause the plunger to move. When the valve 127 disengages its lower seat 132, pressure passes through port 133, port 134, and into the whistle 135 to sound it, thus informing the engineer when the valve 127 has moved to the upper position. When the valve 89 is closed, pressure above the plunger 112 passes through the contracted port 116 beneath the plunger, whereby pressure above and below it are balanced, the spring 122 serving to overcome this balance and retain the plunger elevated. The pressure beneath the plunger passes through port 123, port 131, 130, 129, chamber 128, pipe 140, through either of pipes 144 or 145, to the cylinder 73 of the mechanically operated apparatus which is active. The valve 89 in this apparatus being closed, the escape of the pressure to the atmosphere is prevented. When this valve is open, as in the present case, this pressure may pass to the atmosphere without effecting a movement of the plunger 112, but as soon as the shoe passes over the ramp, the pressure in the cylinder 73 returns it to the lowermost position, and the valve 89 shifted to the closed position, for covering port 91. The pressure now gradually builds up in the casing 80, and when it exceeds the pressure in the cylinder 73, unseats the check valve 85 and supplies additional pressure therein, until the two pressures are equalized. It is thus apparent that when the shoe 55 of the apparatus 46 contacts with the energized ramp 29 and is moved thereby, the engine will not be stopped. With an engine in block A, the ramp 29 guarding the entrance end thereof will be disconnected from the source of current and deënergized. When the engine traveling in block C passes into block D and moves into proximity to the ramp 29, guarding the entrance end of block A, the shoe 55 contacts with this deënergized ramp 29. When this occurs the shoe 55 is elevated, which moves the auxiliary bar 99 upwardly. This movement of the bar 99 moves the pitman 97 upwardly and swings the lever 96 in the same direction, for bringing the port 91 into registration with the port 91'. The ramp 29 being disconnected from the source of current, the solenoid winding 138 is not energized, whereby the valve 127 remains in the lower position. When the ports 91 and 91' are thus placed in registration, as above stated, the pressure beneath the plunger 112 is suddenly reduced, passing through port 123, chamber 124, opening in valve seat 125, (Fig. 9') chamber 128, pipe 140, valve casing 141, pipe 145 and through valve structure 79 to the atmosphere. This sudden reduction of pressure beneath the plunger 112 causes the pressure above it to move the plunger downwardly. This downward movement of the plunger 112 brings the port 159 into registration with the port 160, the port 160 being thereby placed in communication with the interior of the cylinder 108. Pressure then passes through these ports into the chamber 161, and out through pipe 163. A part of this pressure passes through pipe 165 into the cylinder 177, forcing the piston 179 outwardly for swinging the throttle lever 185 to the closed position. The pressure also passes through pipe 164 into the cylinder 176, forcing the piston 175 outwardly, whereby the rod 174 moves the rack bar 171 longitudinally. This movement of the rack bar turns the pinion 168 for swinging the lever 167 in the direction for applying the brakes. It is thus apparent that the engine will be automatically stopped when the mechanically operated apparatus 46 contacts with the ramp 29. The deënergized ramp 39 guarding the entrance end of block A, with respect to traffic from left to right, stopped the engine upon its travel therein, which ramp was deënergized when the ramp 29 guarding the entrance end of block B was deënergized. The operation of the apparatus carried by the engine traveling from left to right is identical with that of the apparatus carried by the engine traveling from right to left, except that the former will be operated by contact with the ramps 39.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. In a train control system, a track, a ramp arranged near the track, means for connecting and disconnecting the ramp with and from a source of current, a vehicle to travel upon the track, a cylinder mounted upon the vehicle, a plunger mounted to reciprocate within the cylinder and having a contracted port formed therethrough, means to supply pressure into the cylinder upon one side of the plunger, a valve for controlling the exhaust of pressure from the cylinder upon the opposite side of the plunger, mechanically operated means adapted to contact with the ramp to be moved thereby and connected with the valve to operate it, electrically operated means connected with the mechanically operated means and adapted when energized to render the valve inoperative with respect to exhausting pressure from the cylinder, signal means operated by and upon the movement of the plunger in one direction, a latch to hold the signal means in the active position, and electrically operated means to shift the latch and connected with the first named electrically operated means.

2. In apparatus of the character described, the combination with a cylinder, of a plunger mounted to reciprocate within the cylinder and having spaced ends and a longitudinal port passing through such spaced ends and provided with a laterally extending port, means arranged within one end of the longitudinal port for retarding the passage of pressure therefrom, means for supplying pressure into the cylinder between the spaced ends, a slide valve arranged within the cylinder between the spaced ends and provided with a longitudinal surface port and a transverse port extending through the opposite sides thereof for communication with the interior of the cylinder, a conduit having a port leading into the cylinder and adapted to be alternately placed in communication with the longitudinal and transverse ports of the slide valve, pressure operated train stopping means connected with the conduit, and electrically operated means for controlling the exhaust of pressure from the cylinder upon one end of the plunger.

3. In apparatus of the character described, the combination with a cylinder, of a plunger mounted to reciprocate therein, means for supplying pressure into the cylinder upon one side of the plunger to cause it to move in one direction, electrically operated means controlling the exhaust of pressure from the cylinder upon the opposite end of the plunger, train stopping means set into action by the movement of the plunger in one direction, a signal apparatus operated by the movement of the plunger, electrically operated means to lock the signal apparatus in one position and connected in series with the first named electrically operated means, and means for energizing the two electrically operated means.

In testimony whereof I affix my signature in presence of two witnesses.

WILLIAM B. MURRAY.

Witnesses:
J. W. WEBSTER,
J. W. FRAME.